United States Patent
Huang et al.

(10) Patent No.: US 9,052,866 B2
(45) Date of Patent: Jun. 9, 2015

(54) METHOD, APPARATUS AND COMPUTER-READABLE MEDIUM FOR IMAGE REGISTRATION AND DISPLAY

(75) Inventors: Chun-Hsiang Huang, Taoyuan County (TW); Chung-Huan Mei, Taoyuan County (TW); Hao-Yuan Chen, Taoyuan County (TW); Li-Hui Chen, Taoyuan County (TW); Cheng-Shiun Jan, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 179 days.

(21) Appl. No.: 13/469,074

(22) Filed: May 10, 2012

(65) Prior Publication Data
US 2013/0300885 A1   Nov. 14, 2013

(51) Int. Cl.
| | |
|---|---|
| H04N 5/232 | (2006.01) |
| H04N 5/225 | (2006.01) |
| H04N 5/222 | (2006.01) |
| G06F 3/14 | (2006.01) |
| H04N 1/387 | (2006.01) |
| G06T 7/00 | (2006.01) |
| H04M 1/725 | (2006.01) |

(52) U.S. Cl.
CPC ............ *G06F 3/1446* (2013.01); *H04N 1/3876* (2013.01); *G06T 7/0028* (2013.01); *G06T 2207/10016* (2013.01); *G09G 2356/00* (2013.01); *H04M 1/7253* (2013.01)

(58) Field of Classification Search
None
See application file for complete search history.

(56) References Cited

U.S. PATENT DOCUMENTS

| | | | |
|---|---|---|---|
| 2006/0165405 A1* | 7/2006 | Kanai et al. ................... | 396/334 |
| 2008/0317267 A1* | 12/2008 | Lee ............................... | 381/300 |
| 2009/0239579 A1 | 9/2009 | Lee et al. | |
| 2010/0002070 A1 | 1/2010 | Ahiska | |
| 2012/0038776 A1* | 2/2012 | Ahiska et al. ................ | 348/159 |
| 2013/0128052 A1* | 5/2013 | Catrein et al. ................ | 348/159 |

OTHER PUBLICATIONS

"Office Action of Germany Counterpart Application", issued on Nov. 19, 2013, p. 1-p. 6.
"Office Action of Taiwan Counterpart Application", issued on Sep. 3, 2014, p. 1-p. 8.

* cited by examiner

*Primary Examiner* — Aung S Moe
*Assistant Examiner* — Euel Cowan
(74) *Attorney, Agent, or Firm* — Jianq Chyun IP Office

(57) ABSTRACT

A method, an apparatus, and a computer-readable medium for image registration and display are provided. In the method, a registration request is respectively sent to each of the electronic apparatuses to control the electronic apparatus to capture a local image and return the captured local image to the master apparatus. Next, an image registration is performed on the local images to obtain registration information among the local images. Then, a relative location between the master apparatus and each electronic apparatus is estimated according to the registration information. Finally, at least one frame to be displayed are oriented according to the estimated relative locations and sent to the electronic apparatuses for display.

15 Claims, 3 Drawing Sheets

METHOD, APPARATUS AND COMPUTER-READABLE MEDIUM FOR IMAGE REGISTRATION AND DISPLAY

BACKGROUND

To cope with a busy pace of modern life, various mobile devices occupying less space and easy to carry are developed. Taking a smart phone as an example, the smart phone not only has various functions of a conventional communication device, but also allows a user to write documents, send and receive emails, browse websites, or use instant messaging software through software inbuilt therein. Namely, the mobile device is not only used for making phone calls, but is also used to provide diversified functions as that does of a smaller personal computer, and with development of wireless network techniques, usage of theses functions is not limited by time and space, and for the modern people demanding efficiency, such device has become one of independent tools in daily life.

However, the mobile device requires features of lightness, slimness, shortness, and smallness, and therefore a size of a screen disposed on the mobile device is limited. The reduction of screen size may limit batches of information capable of being displayed on the screen. As a result, images with high resolution can only be displayed with limited display resolution, and details of the images are lost. Even though a user may magnify the displayed image by using a zoom-in function, the view of image is reduced to a partial image. Therefore, the requirements for resolution and completeness of the image cannot be simultaneously satisfied.

SUMMARY

The present application is directed to a method, an apparatus, and a computer-readable medium for image registration and display, by which multiple electronic apparatuses are located and gathered to display a complete image.

The present application provides an image registration and display method, adapted to a master apparatus of a plurality of electronic apparatuses to orient at lease one frame to be displayed on the electronic apparatuses, in which each electronic apparatus comprises an image capturing unit and a display unit disposed at the same side. In the method, a registration request is respectively sent to each of the electronic apparatuses to control the electronic apparatus to capture a local image and return the captured local image to the master apparatus. Next, an image registration is performed on the local images to obtain registration information among the local images. Then, a relative location between the master apparatus and each electronic apparatus is estimated according to the registration information. Finally, at least one frame to be displayed are oriented according to the estimated relative locations and sent to the electronic apparatuses for display.

In an example of the application, before respectively sending the registration request to the electronic apparatus, the method further establishes a wireless connection with each electronic apparatus to send the registration request and receive the local image through the wireless connection. The wireless connection is, for example, near field communication (NFC), Bluetooth, or Wi-Fi.

In an example of the application, before respectively sending the registration request to the electronic apparatus, the electronic apparatuses are closely placed on a same plane to make the local image captured by each electronic apparatus have an overlapped area with at least one local image captured by other electronic apparatuses.

In an example of the application, in the step of performing the image registration on the local images to obtain the registration information among the local images, a plurality of salient points correspondingly existed in the local images are extracted, and the locations of the salient points in the local images are utilized as the registration information among the local images.

In an example of the application, in the step of estimating the relative location between the master apparatus and each electronic apparatus according to the registration information, at least one parameter of each electronic apparatus are obtained, and the relative location between the master apparatus and each electronic apparatus are estimated by combining the at least one parameter and the registration information. The at least one parameter comprises one or a combination of an image resolution, a focal length of the image capturing unit capturing the local image, a lens location of the image capturing unit, and a display resolution of the display unit.

In an example of the application, in the step of orienting the at least one frame to be displayed according to the estimated relative locations and sending the at least one frame to the electronic apparatuses for display, a display frame is separated into a plurality of portions and the portions of the display frame are respectively sent to the electronic apparatuses for display according to the estimated relative locations.

The present application provides an image registration and display apparatus, which comprises a communication unit, an image registration unit, a location estimation unit, and an image orienting unit. The communication unit is configured to respectively send a registration request to each of a plurality of electronic apparatuses to control the electronic apparatus to capture a local image and return the captured local image. The image registration unit is configured to perform an image registration on the local images to obtain registration information among the local images. The location estimation unit is configured to estimate a relative location between the image registration and display apparatus and each electronic apparatus according to the registration information. The image orienting unit is configured to orient at least one frame to be displayed according to the estimated relative locations and send the at least one frame to the electronic apparatuses for display.

In an example of the application, the communication unit comprises establishing a wireless connection with each electronic apparatus to send the registration request and receive the local image through the wireless connection, in which the wireless connection comprises near field communication (NFC), Bluetooth, or Wi-Fi.

In an example of the application, the electronic apparatuses are placed to make the local image captured by each electronic apparatus have an overlapped area with at least one local image captured by other electronic apparatuses.

In an example of the application, the image registration unit utilizes locations of the salient points in the local images as the registration information among the local images.

In an example of the application, the location estimation unit obtains at least one parameter of each electronic apparatus, and estimates the relative location between the master apparatus and each electronic apparatus by combining the at least one parameter and the registration information. The at least one parameter comprises one or a combination of an image resolution, a focal length of the image capturing unit capturing the local image, a lens location of the image capturing unit, and a display resolution of the display unit.

In an example of the application, the image orienting unit separates a display frame into a plurality of portions and respectively sends the portions of the display frame to the electronic apparatuses for display according to the estimated relative locations.

The present application provides a computer-readable medium, which records a computer program to be loaded into an electronic device to execute the aforementioned method for image registration and display. The computer-readable medium is basically composed of a plurality of program instructions (for example, an organization chart establishing program instruction, a table approving program instruction, a setting program instruction, and a deployment program instruction, etc.), and these program instructions are loaded into the electronic device and executed by the same to accomplish various steps of the method for image registration and display and various functions of the image registration and display device described above.

According to the above descriptions, in the method, the apparatus, and the computer-readable medium for image registration and display of the present application, an image registration is performed on a plurality of images capturing a same scene, a plurality of salient points extracted from the images are used to relative locations between the electronic apparatus. As a result, a frame is oriented to be displayed on the electronic apparatuses, so as to provide the frame with its original resolution.

BRIEF DESCRIPTION OF THE DRAWINGS

The accompanying drawings are included to provide a further understanding of the application, and are incorporated in and constitute a part of this specification. The drawings illustrate examples of the application and, together with the description, serve to explain the principles of the application.

DESCRIPTION OF THE EXAMPLES

In the application, a plurality of electronic apparatuses are closely placed on a same plane to capture images of a same scene. The overlapped areas of the captured images are analyzed through image registration and used to estimate relative locations of the electronic apparatuses. Finally, an image to be displayed is separated into a plurality of portions and displayed on the electronic apparatuses according to the estimated relative locations. Accordingly, a complete view of the image is obtained.

Figure 1:
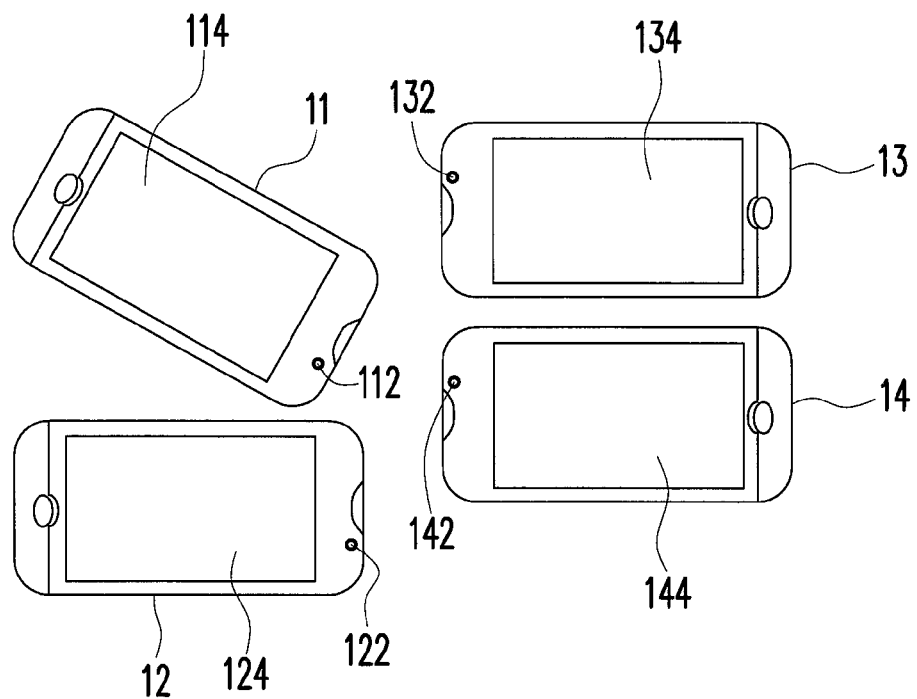
FIG. 1 is a schematic diagram of a method for image registration and display according to an example of the application.

FIG. 1 is a schematic diagram of a method for image registration and display according to an example of the application. Referring to FIG. 1, in the present example, four electronic apparatuses 11~14 are closely placed on a same plane, in which the electronic apparatuses 11 are, for example, mobile phones, smart phones, personal digital assistants (PDAs), or tablets. The electronic apparatuses 11~14 may be closely placed on a same plane to make the local image captured by each of the electronic apparatus 11~14 have an overlapped area with at least one local image captured by other electronic apparatuses 11~14.

As shown in FIG. 1, electronic apparatuses 12~14 are parallelly placed in a horizontal direction while the electronic apparatus 11 is placed in a direction deviated from the horizontal direction. The electronic apparatuses 11~14 respectively comprises image capturing units 112~142 and display units 114~144 at the same side. Since the electronic apparatuses 11~14 are closely placed, the image captured by each of the image capturing unit 112~142 may have at least a portion overlapped with the images captured by other image capturing units 112~142 and the information contained in the overlapped portions may be used to derive relative locations of the electronic apparatuses 11~14.

Figure 2:
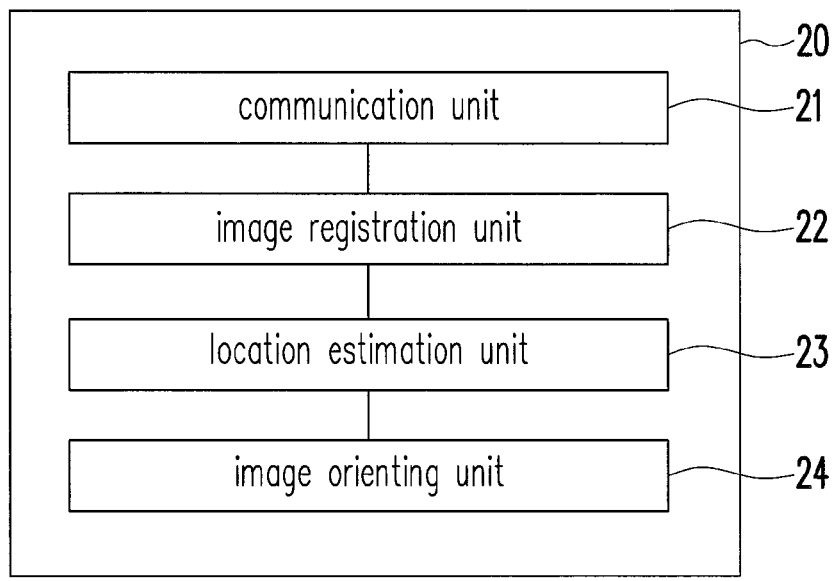
FIG. 2 is a block diagram of an image registration and display apparatus according to an example of the application.
Figure 3:
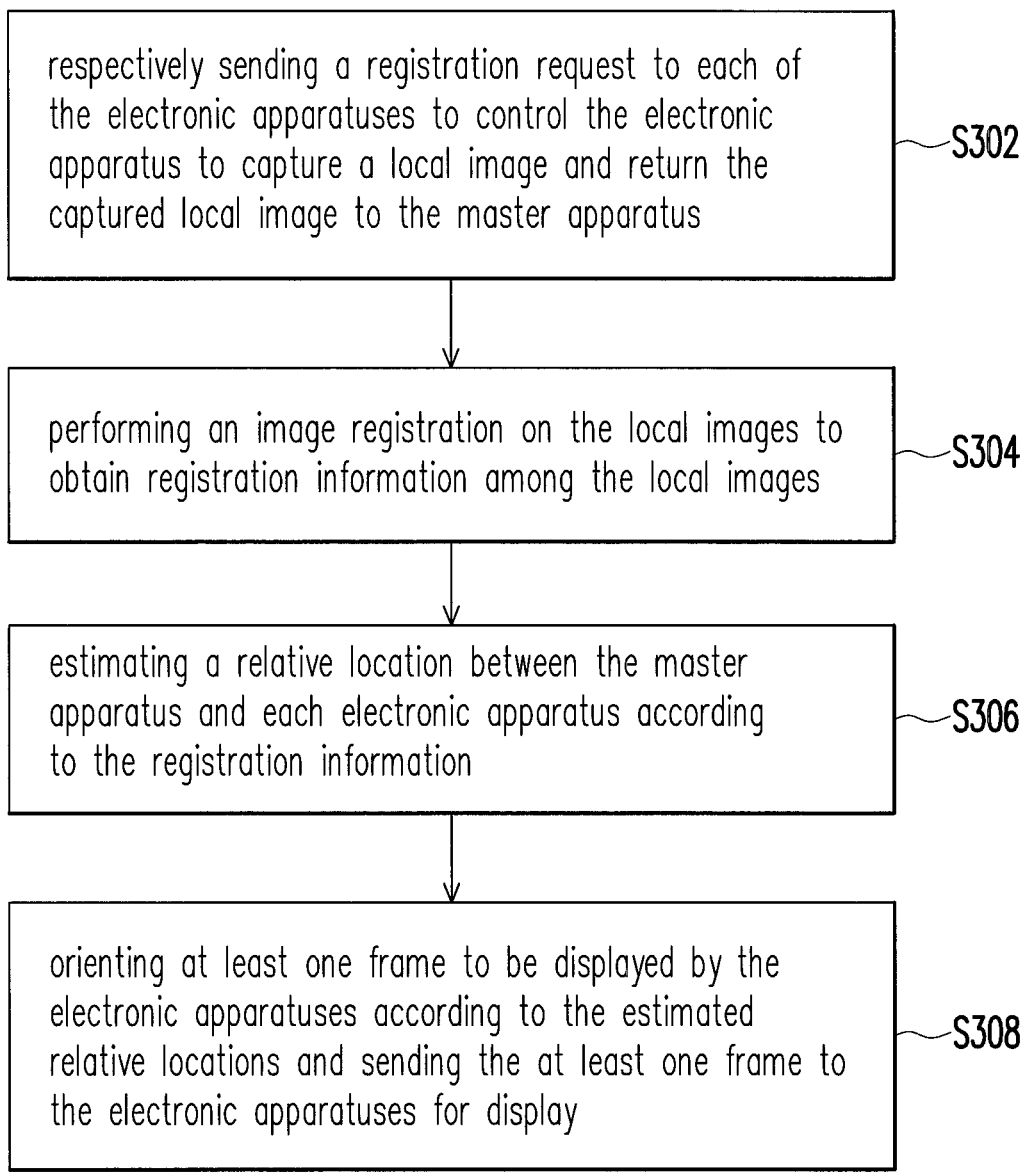
FIG. 3 is a flowchart illustrating an image registration and display method according to an example of the application.

FIG. 2 is a block diagram of an image registration and display apparatus according to an example of the application. FIG. 3 is a flowchart illustrating an image registration and display method according to an example of the application. Referring to FIGS. 1, 2 and 3, the electronic apparatus 20 may be any one of the electronic apparatuses 11~14 in FIG. 1 and is used as a master apparatus for triggering and executing the method for image registration and display. The electronic apparatus 20 comprises a communication unit 21, an image registration unit 22, a location estimation unit 23, and an image orienting unit 24. The method for image registration and display is described in detail below with reference of various components of the electronic apparatus 20.

First, the communication unit 21 is used to respectively send a registration request to a plurality of electronic apparatuses nearby, so as to control each electronic apparatus to capture a local image and return the captured local image to the electronic apparatus 20 (step S302). The communication unit 11 may, for example, support signal transmission of a near field communication (NFC), a Bluetooth, or a wireless fidelity (Wi-Fi), and is used to establish a wireless connection with nearby electronic apparatuses and transceive data through the wireless connection.

Next, the image registration unit 22 is used to perform an image registration on the local images received by the communication unit 21 so as to obtain registration information among the local images (step S304). In detail, the image registration unit 22 may extract a plurality of salient points correspondingly existed in the local images, and utilizes locations of the salient points in the local images as the registration information among the local images. The salient points can assist in resisting rotational, scaling, and translational errors and provide corresponding clues among the local images of the same scene.

Then, the location estimation unit 23 is used to estimate a relative location between the electronic apparatus 20 and each of other electronic apparatuses according to the registration information (step S306). In detail, based on the salient points extracted in step S304, the rotation, the scale, and the translation among the captured local images can be derived and further used to estimate the relative locations between the electronic apparatus 20 and other electronic apparatuses.

It is noted herein that the local images captured by the electronic apparatus 20 and other electronic apparatuses are also influenced by the hardware specification of the apparatus, and therefore the estimation of relative locations of the electronic apparatuses may require referencing parameters of each of the electronic apparatuses. Accordingly, the location estimation unit 23 obtains at least one parameter of each electronic apparatus and accordingly estimates the relative location between the electronic apparatus 20 and each of other electronic apparatuses by combining the at least one parameter and the registration information. The at least one parameter is, for example, one or a combination of an image resolution, a focal length of the image capturing unit capturing the local image, a lens location of the image capturing unit, and a display resolution of the display unit of each of the electronic apparatuses.

Finally, the image orienting unit 24 orients at least one frame to be displayed by the electronic apparatus 20 according to the estimated relative locations estimated by the location estimation unit 23 and sends the at least one frame to the electronic apparatuses for display through the communication unit 21 (step S308). In detail, the image orienting unit 24 may separate a display frame to be displayed into a plurality of portions and respectively send the portions of the display frame to other electronic apparatuses for display according to the relative locations.

The aforesaid image registration and display steps may be automatically executed by the electronic apparatus 20 as long as the users place their own electronic apparatuses around the electronic apparatus 20. After a while, the relative locations of the electronic apparatus 20 are obtained and the frame to be displayed are correspondingly oriented and sent to the electronic apparatuses for display.

Based on the above, the proposed method is able to expand the frame originally displayed on one electronic apparatus to multiple electronic apparatus nearby, and accordingly the resolution and the completeness of the image can be simultaneously satisfied.

Figure 4:
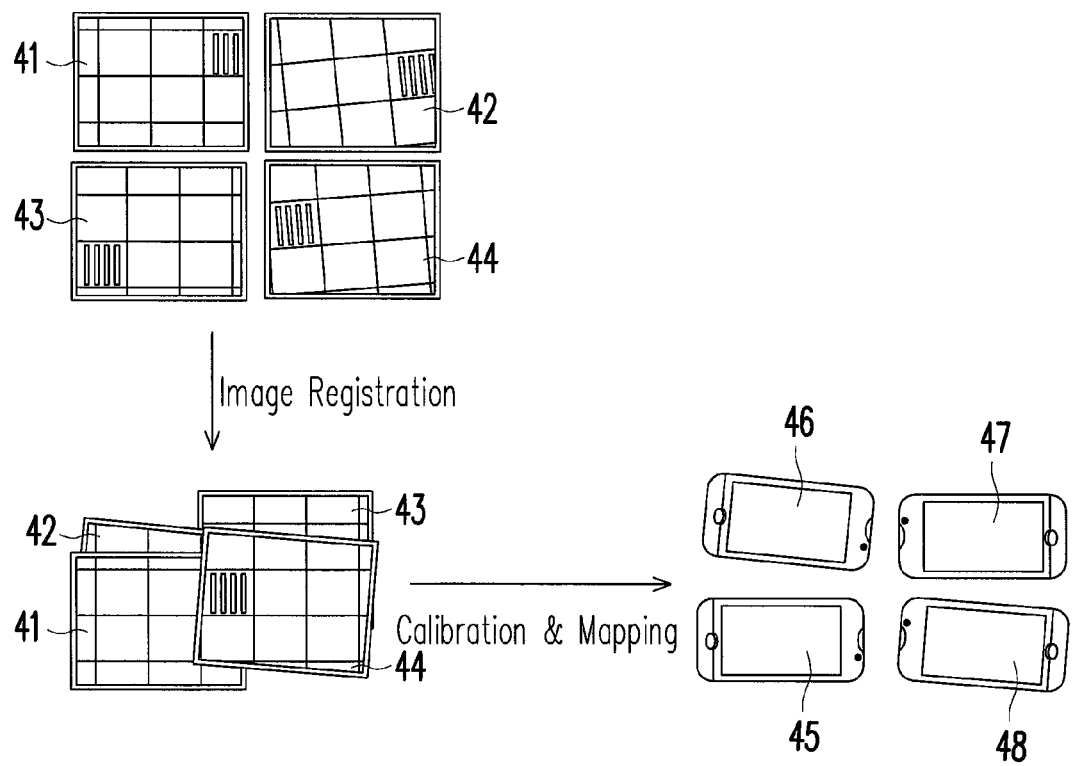
FIG. 4 is an example illustrating a method for image registration and display according to an example of the application.

FIG. 4 is an example illustrating a method for image registration and display according to an example of the application. Referring to FIG. 4, images 41~44 are captured by mobile apparatuses 45~48. The mobile apparatuses 45~48 are closely placed on a table in an office with a front side facing upward, and therefore the images 41~44 comprises a plurality of features of a ceiling of the office. The captured images 41~44 may be sent to the mobile apparatus 45 and processed by the mobile apparatus 45 using image registration. The registered images 41~44 may reflect the relative locations of the mobile apparatus 45~48 and therefore are used to estimate the relative locations through processes of calibration and mapping. Finally, the orientation of mobile apparatus 45~48 are obtained. Based on the orientation, the mobile apparatus 45 may distribute a plurality of frames to the mobile apparatus 46~48 for display, so as to display an image with original resolution.

In case the electronic apparatuses are placed at locations having no scene or effective scene for reference, the user may further place a reference object (e.g. his head) in front of the cameras of the electronic apparatuses. Accordingly, the electronic apparatus may perform the image registration according to information of the reference object, and finally similar function can be achieved.

Figure 5:
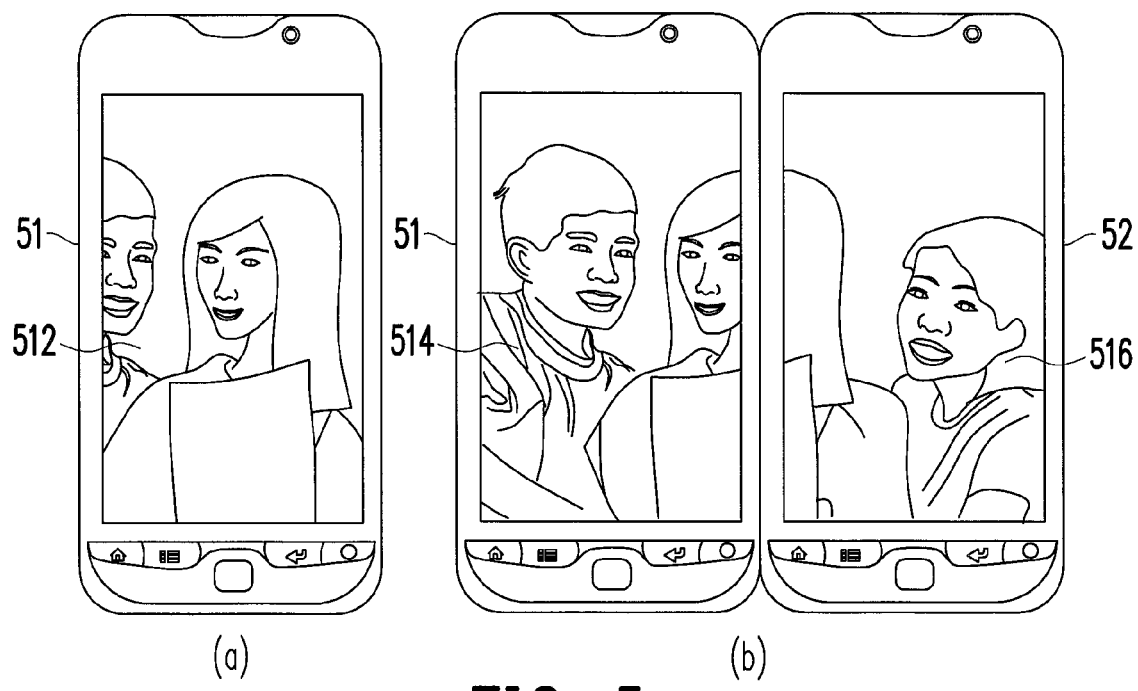
FIG. 5(a) and FIG. 5(b) illustrate an example of expanding a frame to nearby electronic apparatuses according to an example of the application.

FIG. 5(*a*) and FIG. 5(*b*) illustrate an example of expanding a frame to nearby electronic apparatuses according to an example of the application. Referring to FIG. 5(*a*), the frame 512 displayed on the screen of mobile apparatus 51 is an image cropped from a family photo. Because of the limited screen size of the mobile apparatus 51, only mother and son can be seen in the displayed frame. However, through the image registration and display method described above, when another electronic apparatus 52 is placed next to the electronic apparatus 51, the mobile apparatus 51 may automatically trigger the electronic apparatus 52 and itself to capture local images, perform the image registration on the local images to derive the relative location of the electronic apparatus 52, orients frames 514 and 516 to be displayed, and sends the frame 516 to the electronic apparatus 52 for display. Finally, a whole family photo including mother, son and daughter is displayed without miscellaneous settings or constrains.

The aforesaid image registration and display method may be further applied to various location-aware applications. For example, in a multi-party air-hockey game, the participant may strike the hockey to another electronic apparatus at the location relative to a current apparatus according to the direction that the participant strikes the hockey. Accordingly, more participants can involve in the game.

The application provides a computer-readable medium which records a computer program to be loaded into an electronic device to execute the aforementioned various steps of the method for image registration and display. The computer program is basically composed of a plurality of program instructions (for example, an organization chart establishing program instruction, a table approving program instruction, a setting program instruction, and a deployment program instruction, etc.), and these program instructions are loaded into the electronic device and executed by the same to accomplish various steps of the method for image registration and display and various functions of the electronic device described above.

To sum up, in the method, the apparatus, and the computer-readable medium for image registration and display of the present application, the images respectively captured by cameras of different electronic apparatuses are used to locate the electronic apparatuses, and no additional hardware component is required. According to the estimated locations of electronic apparatuses, a frame is separately displayed on various electronic apparatuses, and therefore the requirements for resolution and completeness of the image can be simultaneously satisfied.

It will be apparent to those skilled in the art that various modifications and variations can be made to the structure of the application without departing from the scope or spirit of the application. In view of the foregoing, it is intended that the application cover modifications and variations of this application provided they fall within the scope of the following claims and their equivalents.

What is claimed is:

1. An image registration and display method, adapted to a master apparatus of a plurality of electronic apparatuses to orient at least one frame to be displayed on the electronic apparatuses, wherein each electronic apparatus comprises an image capturing unit and a display unit disposed at the same side and the method comprises:

respectively sending a registration request to each of the electronic apparatuses to control the electronic apparatus to capture a local image and return the captured local image to the master apparatus;

performing an image registration on the local images to obtain a registration information among the local images;

estimating a relative location between the master apparatus and each electronic apparatus according to the registration information; and orienting at least one frame to be displayed according to the estimated relative locations and sending the at least one frame to the electronic apparatuses for display, wherein the step of estimating the relative location between the master apparatus and each electronic apparatus according to the registration information comprises:

obtaining at least one parameter of each electronic apparatus; and estimating the relative location between the master apparatus and each electronic apparatus by combining the at least one parameter and the registration information.

2. The image registration and display method of claim 1, wherein before respectively sending the registration request to the electronic apparatus, the method further comprises:
establishing a wireless connection with each electronic apparatus to send the registration request and receive the local image through the wireless connection.

3. The image registration and display method of claim 2, wherein the wireless connection comprises near field communication (NFC), Bluetooth, or Wi-Fi.

4. The image registration and display method of claim 1, wherein before respectively sending the registration request to the electronic apparatus, the method further comprises:
closely placing the electronic apparatuses on a same plane to make the local image captured by each electronic apparatus have an overlapped area with at least one local image captured by other electronic apparatuses.

5. The image registration and display method of claim 2, wherein the step of performing the image registration on the local images to obtain the registration information among the local images comprises:
extracting a plurality of salient points correspondingly existed in the local images, and utilizing locations of the salient points in the local images as the registration information among the local images.

6. The image registration and display method of claim 1, wherein the at least one parameter comprises one or a combination of an image resolution, a focal length of the image capturing unit capturing the local image, a lens location of the image capturing unit, and a display resolution of the display unit.

7. The image registration and display method of claim 1, wherein the step of orienting the at least one frame to be displayed according to the estimated relative locations and sending the at least one frame to the electronic apparatuses for display comprises:
separating a display frame into a plurality of portions and respectively sending the portions of the display frame to the electronic apparatuses for display according to the estimated relative locations.

8. An image registration and display apparatus, comprising:
a communication unit, configured to respectively send a registration request to each of a plurality of electronic apparatuses to control the electronic apparatus to capture a local image and return the captured local image;
an image registration unit, configured to perform an image registration on the local images to obtain a registration information among the local images;
a location estimation unit, configured to estimate a relative location between the image registration and display apparatus and each electronic apparatus according to the registration information; and
an image orienting unit, configured to orient at least one frame to be displayed according to the estimated relative locations and send the at least one frame to the electronic apparatuses for display,
wherein the location estimation unit comprises obtaining at least one parameter of each electronic apparatus, and estimating the relative location between the master apparatus and each electronic apparatus by combining the at least one parameter and the registration information.

9. The image registration and display apparatus of claim 8, wherein the communication unit comprises establishing a wireless connection with each electronic apparatus to send the registration request and receive the local image through the wireless connection.

10. The image registration and display apparatus of claim 9, wherein the wireless connection comprises near field communication (NFC), Bluetooth, or Wi-Fi.

11. The image registration and display apparatus of claim 8, wherein the electronic apparatuses are closely placed on a same plane to make the local image captured by each electronic apparatus have an overlapped area with at least one local image captured by other electronic apparatuses.

12. The image registration and display apparatus of claim 8, wherein the image registration unit comprises extracting a plurality of salient points correspondingly existed in the local images, and utilizing locations of the salient points in the local images as the registration information among the local images.

13. The image registration and display apparatus of claim 8, wherein the at least one parameter comprises one or a combination of an image resolution, a focal length of the image capturing unit capturing the local image, a lens location of the image capturing unit, and a display resolution of the display unit.

14. The image registration and display apparatus of claim 8, wherein the image orienting unit comprises separating a display frame into a plurality of portions and respectively sending the portions of the display frame to the electronic apparatuses for display according to the estimated relative locations.

15. A non-transitory computer-readable medium, recording program instructions for:
respectively sending a registration request to each of a plurality of electronic apparatuses to control the electronic apparatus to capture a local image and return the captured local image to the master apparatus;
performing an image registration on the local images to obtain a registration information among the local images;
estimating a relative location between the master apparatus and each electronic apparatus according to the registration information; and
orienting at least one frame to be displayed according to the estimated relative locations and sending the at least one frame to the electronic apparatuses for display, wherein the step of estimating the relative location between the master apparatus and each electronic apparatus according to the registration information comprises:
obtaining at least one parameter of each electronic apparatus; and
estimating the relative location between the master apparatus and each electronic apparatus by combining the at least one parameter and the registration information.

* * * * *